(12) United States Patent
Ono

(10) Patent No.: US 7,008,659 B1
(45) Date of Patent: *Mar. 7, 2006

(54) INERT GAS-FILLED COOKING SYSTEM

(75) Inventor: Takuji Ono, Okayama (JP)

(73) Assignee: Ono Foods Industrial Co., Ltd., Okayama (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/700,365

(22) PCT Filed: Mar. 6, 1995

(86) PCT No.: PCT/JP95/00359

§ 371 (c)(1),
(2), (4) Date: Nov. 12, 1996

(87) PCT Pub. No.: WO95/23526

PCT Pub. Date: Sep. 8, 1995

(30) Foreign Application Priority Data

Mar. 4, 1994 (JP) .................................... 6-59954

(51) Int. Cl.
B65B 55/00 (2006.01)
(52) U.S. Cl. ...................................... 426/412; 426/521
(58) Field of Classification Search ................ 426/412, 426/407, 521; 436/407, 412
See application file for complete search history.

(56) References Cited

U.S. PATENT DOCUMENTS

| | | | | | |
|---|---|---|---|---|---|
| 3,892,058 | A | * | 7/1975 | Komatsu et al. | .......... 53/21 FC |
| 5,277,923 | A | * | 1/1994 | Mignogna et al. | .......... 426/407 |
| 5,395,634 | A | * | 3/1995 | Humphreys | .................. 426/312 |
| 5,562,938 | A | * | 10/1996 | Lee et al. | .................... 426/106 |

FOREIGN PATENT DOCUMENTS

JP         59-210879 A   * 11/1984

OTHER PUBLICATIONS

Wayne Gisslen, Professional Cooking, 2nd Edition, John Wiley & Sons Inc., 1989, pp. 58 and 111.*

* cited by examiner

*Primary Examiner*—Drew Becker
(74) *Attorney, Agent, or Firm*—Bacon & Thomas

(57) ABSTRACT

An inert gas-filled cooking process is disclosed which provides for quick sterilization of food in inert gas-filled packages in a manner that prevents deterioration of food quality as well as assures a long taste guaranteed period by raising the temperature of hot water to be applied onto the food packages in a sterilization tank so as to satisfy the retort sterilization requirements.

The sterilization tank is pressurized at a predetermined value by control of an analog pressure regulating valve. The temperature of the hot water flowing from a heat exchanger into the sterilization tank is varied in a multi-staged fashion to follow a predetermined sterilization temperature-time curve by control of an analog steam regulating valve and a steam superheater. The hot water is applied onto the packaged food for sterilization.

2 Claims, 6 Drawing Sheets

FIG. 2

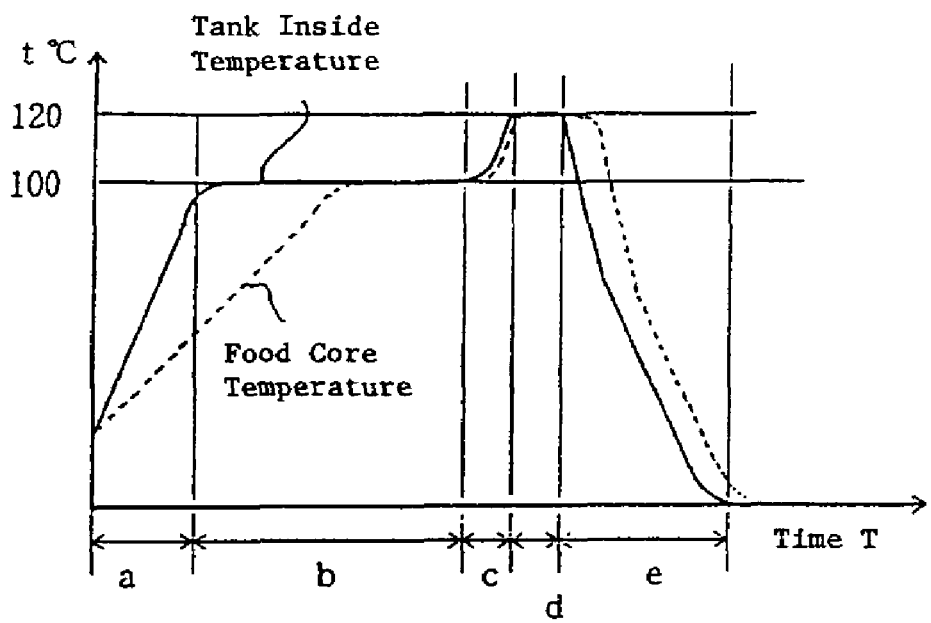

FIG. 3

| Food in inert gas-filled pck. | Primary Temp. Raising Step<br>a | Primary Sterilizn.<br>b | Secondary Temp. Raising<br>d | Cooling<br>e |
|---|---|---|---|---|
| Seasoned Vegetables (small package) | 3 min. | 100°C<br>5 min. | 110°C<br>25 min. | 4 min. |
| Seasoned Vegetables & Beef (small package) | 3 min. | 100 to 110 °C<br>20 to 30 min. | 110 to 120 °C; 5 to 10 min. | 5 min. |
| Seasoned Vegetables & Beef (for restaurant use) | 3 min. | 100 to 110 °C; 30 to 40 min. | 110 to 120 °C; 5 to 10 min. | 10 min. |
| Seasoned Beef (small package) | 3 min. | 110°C<br>20 to 30 min. | 120°C<br>5 to 10 min. | 5 min. |

Beef and Burdock Sliced Thin and Cooked Lightly With Seasonings

Yellowtail Broiled With Soy

| Food in Inert Gas-Filled Pack. | Heating Time A | Sterili. Time D | Cooling D |
|---|---|---|---|
| Seasoned Vegetables (small package) | 10 min. | 110°C 30 min. | 10 min. |
| Seasoned Beef & Vegetables (small package) | 10 min. | 110 to 120 °C 30 min. | 10 min. |
| Seasoned Beef & Vegetables (for restaurant use) | 15 min. | 110 to 120 °C 50 min. | 15 min. |
| Seasoned Beef (small package) | 10 min. | 110 to 120 °C 40 min. | 10 min. | ic system # INERT GAS-FILLED COOKING SYSTEM

FIELD OF THE INVENTION

The present invention relates to the sterilization of foods in inert gas-filled packages and, more particularly, to an inert gas-filled cooking method.

BACKGROUND OF THE INVENTION

Conventionally, in a sterilization process for food in inert gas-filled packages, food which has been cooked up to a certain stage is put into a bag ("retort pouch") formed of highly gas-impermeable laminated sheet material; the bag is hermetically sealed as by heat sealing after replacing the air in the bag with an inert gas; the bag thus sealed is loaded into a sterilization tank; and a hot water or heated steam is fed into the sterilization tank to sterilize the food in the bag.

To enhance the sterilization effect as well as to maintain the taste, shape and quality of the food, it is desirable that the sterilization be performed at a higher temperature and for a short period of time. According to a certain heat sterilization standard, the temperature of 120° C. is generally maintained for four minutes at the heart of the food (F value-4).

In a conventional sterilization tank, the food in inert gas-filled packages is immersed in hot water for a certain period of time, or otherwise, the food is subjected to sprays of hot water or heated steam for a certain period of time in a certain pressurized condition. However, as shown in FIG. 9, these methods cannot raise the core temperature of the food in inert gas-filled packages readily to a predetermined sterilization temperature. Also, temperature control tends to be inaccurate. Accordingly, it is necessary to increase the heating time equivalently if it is desired to enhance the sterilization effect. As a matter of fact, the sterilization is performed in the neighborhood of 120° C. for about 60 minutes.

This can provide for adequate sterilization of a major portion of bacteria which cause food poisoning; however, some bacteria can survive the treatment. Accordingly, in order to enhance the sterilization effect 3-percent hydrogen peroxide sorbic acid or the like are used additionally, or packages are sealed under a vacuum or an inert gas atmosphere.

During the sterilization process, the food is kept under a heated condition for an extended period of time so that the food sometimes acquires the smell characteristic of the retort pouch with its organoleptic properties deteriorating. Some foods, which need to be shipped in a semi-cooked condition, tend to be cooked over beyond that condition. These provide limitations on quality control of foods in inert gas-filled packages.

The present invention overcomes the above-stated problems of the prior art by providing an inert gas-filled cooking process which can sterilize foods in inert gas-filled packages rapidly and effectively without deteriorating food quality by raising the temperature of the hot water to be applied onto the food packages in the sterilization tank.

SUMMARY OF THE INVENTION

The present invention achieves the above-stated object by providing an inert gas-filled cooking process which comprises: a food filling step of filling a preliminarily processed food into packages and hermetically sealing the packages under inert gas atmosphere; a food package loading step of loading the food packages into a sterilization tank; a pressurization step of pressurizing the sterilization tank having the food packages loaded therein at a predetermined pressure value; a primary temperature raising step of raising the temperature of the packaged food to a first predetermined value by reheating a heated steam supplied to the primary of a heat exchanger by means of a steam superheater to cause a rapid increase in the temperature of a hot water flowing in the secondary of the heat exchanger into the sterilization tank for application onto the food package; a temperature maintaining step of maintaining the temperature of the packaged food at the first predetermined value by continuing with the supply of the hot water; a secondary temperature raising step of raising the temperature of the packaged food to a second predetermined food sterilization temperature by increasing the temperature of the hot water supplied to the sterilization tank; a sterilization step of maintaining the second predetermined food sterilization temperature for a predetermined time; and a cooling step of rapidly cooling the packaged food from the second predetermined food sterilization temperature by applying a cooling water instead of the hot water on the food package.

Food is put into a retort pouch by means of a tube or other food filling means; the air in the pouch is replaced with an inert gas by a replacing means in a continuous process; the pouch is stretched in its both ends by a stretching means; the pouch thus stretched is heat sealed by a heat sealing means to provide the food in inert gas-filled and hermetically sealed packages; and the packages are placed on a transport rack having a plurality of shelves for loading into the sterilization tank.

In this condition, the pressure in the sterilization tank is raised to, and maintained at, the predetermined value, by means of a pressure sensor provided within the sterilization tank and the analog pressure regulating valve provided in the pneumatic conduit; the temperature of the hot water flowing in the secondary of the heat exchanger is raised by increasing the temperature of the heated steam flowing in the primary of the heat exchanger; and the hot water is applied onto the food packages in the sterilization tank by means of the circulating pump.

Provided in the conduit leading from a boiler to the heat exchanger are an analog steam regulating valve and a steam superheater which generates superheated steam by reheating the heated steam from the boiler. The heat exchanger raises the temperature of the hot water to the predetermined value so that its application onto the packaged food will raise the food temperature to the predetermined value to provide for rapid sterilization of the food.

Immediately after commencement of an operation, the opening of the analog steam regulating valve is increased to increase the flow rate and the temperature of the heated steam flowing into the heat exchanger. Simultaneously therewith, the heated steam to be supplied to the primary of the heat exchanger is reheated by the steam superheater so as to rapidly raise the temperature of the hot water flowing from the heat exchanger to the sterilization tank for application onto the packaged food therein. Thus, the temperature of the food in inert gas-filled packages is raised to approximately 100° C. as the primary temperature-raising step. In this condition, the temperature is maintained for a certain period of time by controlling the steam superheater. After a predetermined time has elapsed, the steam superheater is controlled so as to raise the temperature of the hot water to the predetermined sterilization temperature of approximately 120° C. as the secondary temperature-raising step. This temperature is maintained for a predetermined period of time (four to six minutes) for sterilization. A predetermined time thereafter, the steam superheater is shutdown; a two-way change-over valve is operated to stop the application of the hot water; the hot water remaining in the sterilization tank is recovered to a hot water recovery tank. Simultaneously therewith, the food in inert gas-filled packages is cooled to a temperature suitable for shipment by supplying a cooling water from a first and a second cooling water tank to water application assemblies.

For the packaged foods to be shipped in a cooked condition, a partially cooked food is filled into a retort pouch together with liquid-state seasonings; the air remaining in the pouch is replaced with an inert gas; the pouch is hermetically sealed; and the pouch is then loaded into the sterilization tank. Hot water to be applied is heated to the predetermined temperature as the primary temperature-raising step; this temperature is maintained for a predetermined time necessary to complete cooking; the hot water is further heated to the predetermined temperature for sterilization as the secondary temperature-raising step. Both cooking and sterilization are performed in this single step. In this manner, the temperature of the food in inert gas-filled packages and the temperature of the hot water are varied to conform to the sterilization temperature-time curve suitable for sterilization.

BRIEF DESCRIPTION OF THE DRAWINGS

FIG. 2 is a plot showing a sterilization temperature-time curve according to the present invention for use with foods in inert gas-filled packages;

FIG. 3 is a table showing an embodiment of the sterilization temperature-time curves for foods in inert gas-filled packages;

DESCRIPTION OF THE PREFERRED EMBODIMENTS

The present invention will be described with respect to embodiments as shown in the accompanying drawings.

Figure 1:
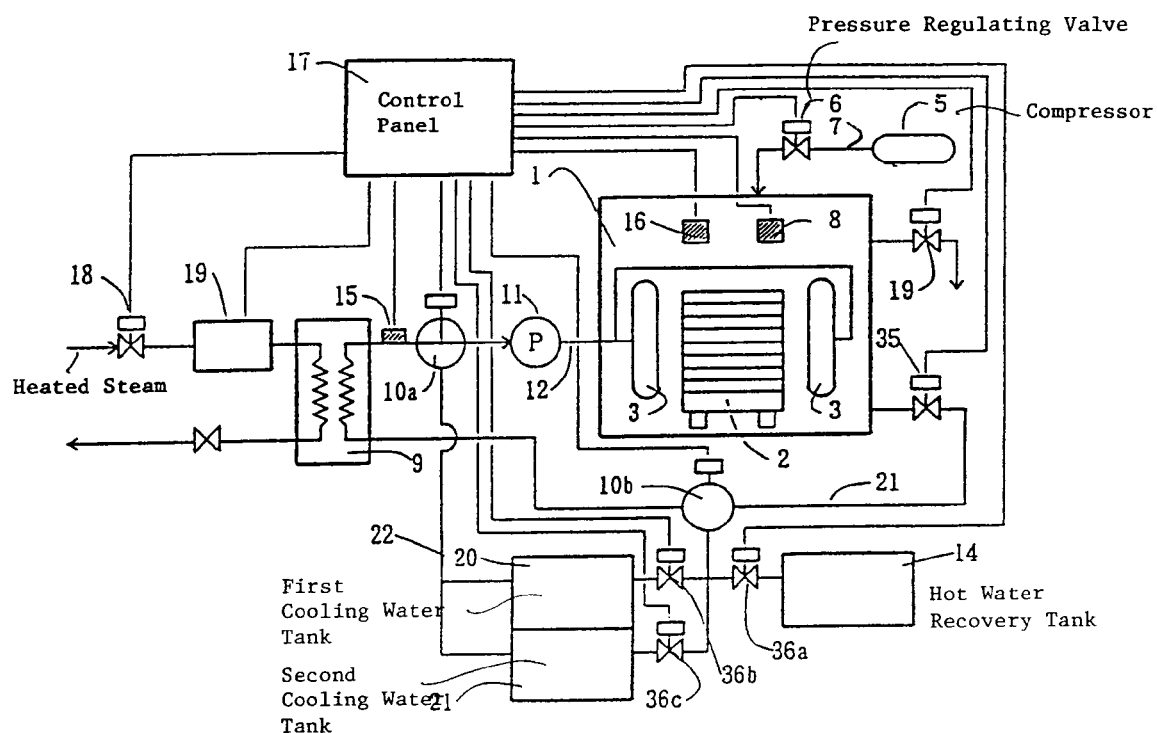
FIG. 1 is a block diagram showing the system configuration of an embodiment of the present invention.

Referring to FIG. 1 which shows, in block form, the configuration of an embodiment of the present invention, heated steam generated by a boiler (not shown) flows via an analog steam regulating valve 18 and a steam superheater 19 into the primary of a heat exchanger 9 for heat exchange with hot water flowing in the secondary of the heat exchanger. The hot water flows via a two-way change-over valve 10a to a circulating pump 11 which feeds the water via a conduit 12 to water application assemblies 3 to apply it onto the food packages placed in a sterilization tank 1 so as to heat the food. After heat exchange with the food, the hot water is collected in the bottom portion of the sterilization tank 1 for recirculation via a drain valve 35 and a return conduit 13 to the secondary of the heat exchanger 9.

After the food packages have been heated by the hot water for a predetermined time for complete sterilization, the two-way change-over valve 10a is operated to stop the flow of the hot water. The hot water remaining in the sterilization tank 1 is then recovered into a hot water recovery tank 14 via a two-way change-over valve 10b and an ON-OFF valve 36a.

After completion of the recovery process, the ON-OFF valve 36a is closed and an ON-OFF valve 36b is opened and the circulating pump 11 is operated to feed a cooling water from a first cooling water tank 20 via the two-way change-over valve 10a to the water application assemblies 3 so that the cooling water is applied onto the food packages in the sterilization tank 1. The cooling water, after having been warmed through contact with the food packages, is recovered by the first cooling water tank 20. Then, the ON-OFF valve 36b is closed and an ON-OFF valve 36c is opened, allowing cooling water to flow from a second cooling water tank 21. In this manner, the first and second cooling water tanks 20 and 21 are used alternately, lowering the temperature of the cooling water for resupply until the food packages have been cooled enough for removal from the tank.

The sterilization tank 1 includes a pressure-resistant housing provided with an air-tight door (not shown) through which a transport rack 2 having numerous shelves for receiving food packages thereon can be brought into or from the housing. Provided within the sterilization tank are a pair of opposed water application assemblies 3 each including a plurality of nozzles 4 for applying the hot or cooling water onto the food packages placed on the transport rack.

Figure 5:
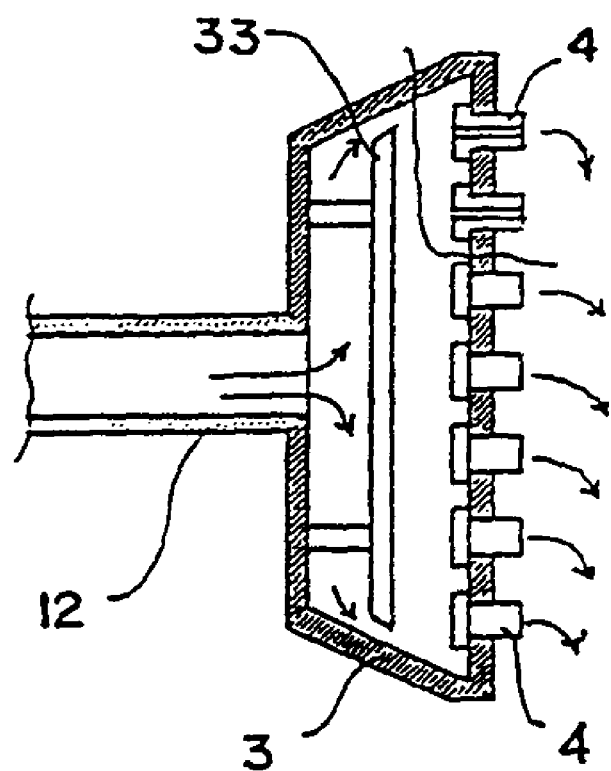
FIG. 5 is a sectional view of a water application assembly provided in a sterilization tank.
Figure 6:
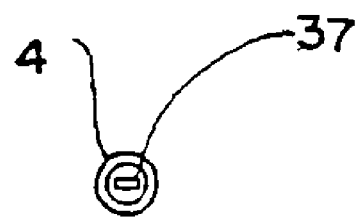
FIG. 6 is a front view of a nozzle of the water application assembly shown in FIG. 5.

Referring to FIG. 5, the water application assembly 3 as depicted has connected to one side thereof, the conduit 12 leading from the circulating pump 11 and includes, on the other side, a plurality of the nozzles 4 disposed in spaced relationship. Provided within the water application assembly 3 is a pressure equalizing plate 33 which is disposed between the conduit 12 and nozzles 4 spacedly therefrom to act as a baffle for the incoming hot (or cooling) water under pressure by the circulating pump 11 so that the water may spread evenly within the water application assembly 3. As shown in FIG. 6, the nozzle 4 has a rectangular opening 37 for applying a progressively increasing strip of hot or cooling water evenly throughout the food packages.

Further, a pneumatic conduit 7 is provided on the ceiling of the sterilization tank 1 to regulate the pressure in the tank. A compressor 5 is used together with an analog pressure regulating valve 6 to increase the pressure in the tank. A pressure sensor 8 provided within the sterilization tank is used to sense the pressure in the tank. The analog pressure regulating valve 6 and the drain valve 34 are operated to maintain the pressure in the tank at a predetermined pressure value corresponding to the temperature of the hot water.

The steam superheater 19 reheats the heated steam flowing therethrough and converts it into a superheated steam by a separate heat source such as, for example, an electric heater with a heat exchange mechanism. The steam superheater feeds such a superheated steam to the primary of the heat exchanger 9 and generates high temperature water at the secondary thereof.

A hot water temperature sensor 15 is provided in the secondary of the heat exchanger 9 and also a tank inside temperature sensor 16 is provided within the sterilization tank 1. They sense the hot water temperature and the tank inside temperature, respectively, and feed information on sensed temperatures to a control panel 17 which controls the operation of the steam superheater 19 and the opening of the analog steam regulating valve 18 so as to vary the hot water temperature and the tank inside temperature to follow the predetermined sterilization temperature-time curve.

FIG. 2 is a plot of such sterilization temperature-time curve for the food packages placed in the sterilization tank, showing the time T on an abscissa and the tank inside temperature t° C. on an ordinate.

To begin the sterilization process, food in inert gas-filled packages is loaded into the sterilization tank 1; and the temperature of the heated steam is raised by means of the analog steam regulating valve 18 and the steam superheater 19 so as to increase the temperature of the hot water circulating from the heat exchanger 9 into the sterilization tank for application onto the food packages. In this manner, the tank inside temperature t is increased rapidly to a predetermined value (about 100° C.) (the primary temperature-raising section a); the predetermined temperature is maintained for a certain period of time (the temperature maintaining section b); the steam superheater 19 is then controlled to reheat the heated steam so as to increase further the temperature of the hot water flowing from the heat exchanger 9 (the secondary temperature-raising section c); sterilization is performed by maintaining a predetermined sterilization condition F04 (120° C., four minutes); and the food packages are cooled by switching into application of the cooling water upon completion of the sterilization process. It is to be noted that the broken lines in FIG. 2 show the food core temperature.

The control panel 17 operates to sequentially compare the temperature information from the tank inside temperature sensor 16 with a preset reference value from the sterilization temperature-time curve for each food in inert gas-filled packages, and if the preset temperature is not exceeded, to increase the opening of the analog steam regulating valve 18 to cause an increase in the temperature of the hot water circulating in the secondary of the heat exchanger 9. If the temperature information from the tank inside temperature sensor 16 is higher than the preset temperature value on the sterilization temperature-time curve, the opening of the analog steam regulating valve 18 is reduced to decrease the flow of the heated steam. Simultaneously therewith, the steam superheater 19 is operated based on the temperature information from the hot water temperature sensor 15 to cause a decrease in the temperature of the hot water and accordingly the tank inside temperature t so that the preset temperature from the sterilization temperature-time curve is followed.

FIG. 3 is a table showing exemplary sterilization temperature-time curves for various foods in inert gas-filled packages, wherein a, b, c and d in the top row represent the primary temperature-raising step, the primary sterilization (temperature maintaining) step, the secondary temperature-raising step and the cooling step, respectively. Except for "vegetables boiled with soy (small packages)", cooking and sterilization are performed during the primary sterilization (temperature maintaining) step. For those packaged foods which do not require cooking, the temperature-maintaining step (b section) can be shortened prior to shifting into the secondary sterilization and the cooling steps.

Figures 9, 10:
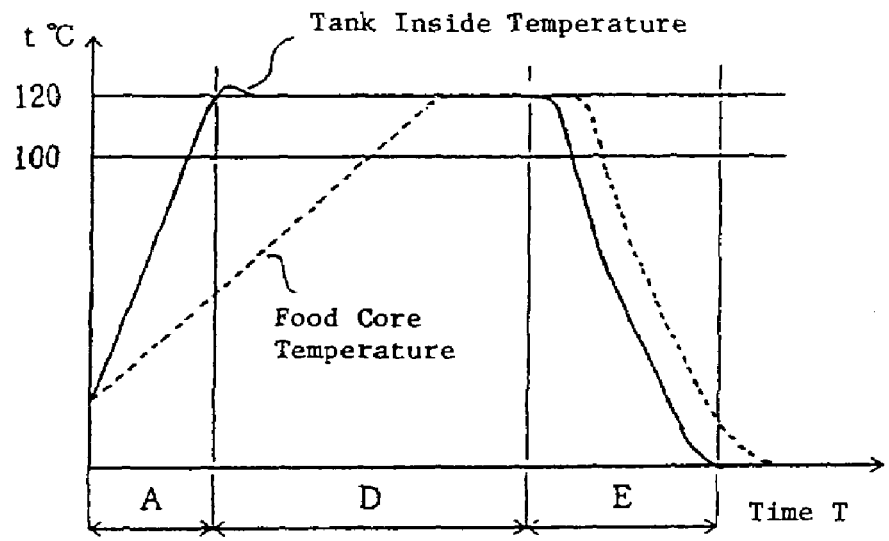
FIG. 9 is a plot showing a sterilization temperature-time curve for foods in inert gas-filled packages as prepared in a conventional manner.
FIG. 10 is a table showing an embodiment of the sterilization temperature-time curves according to a conventional retorting method.

FIG. 10 shows the time required to perform sterilization of the same retorted foods using a conventional sterilization tank. Comparison of FIGS. 3 and 10 indicates that the overall processing time is reduced substantially for all the foods under test and that the shortening of the sterilization time with a high temperature of 110 to 120° C. (d and D of the respective tables) removes the problem that food acquires smell characteristic of a retort pouch with the smell and taste of the food deteriorating and that some foods, which need to be shipped in a semi-cooked condition, tend to be cooked over beyond that condition.

Figure 4:
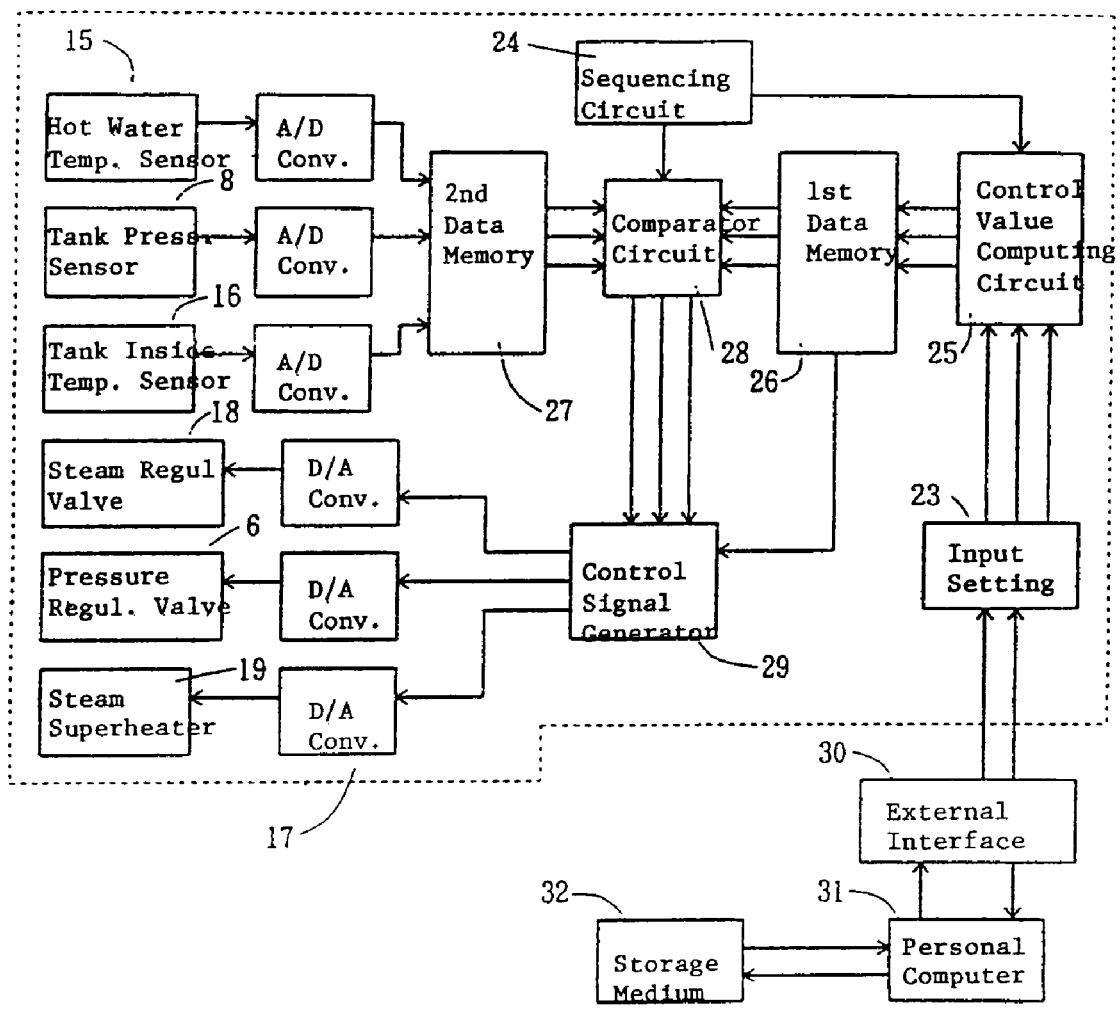
FIG. 4 is a block diagram showing the control arrangement of the embodiment of the present invention.

FIG. 4 is a block diagram of the control arrangement according to the present invention. The control panel 17 comprises an input setting circuit 23 for inputting the sterilization temperature-time curve preset for a food in inert gas-filled packages, a sequencing circuit 24 for controlling the process according to a predetermined timing, a control value computing circuit 25 for computing control data such as set values for the heated steam temperature, the heated water temperature, the tank inside temperature, and the tank inside pressure, and adjusted values for the analog steam regulating valve 18 and the analog pressure regulating valve 6, by following the sterilization temperature-time curve using the elapsed time as a reference parameter, a first data memory 26 for storing the control data computed by the control value computing circuit 25 according to the timing selected by the sequencing circuit 24, a second data memory 27 for storing the hot water temperature information from the hot water temperature sensor 15 and the information from the tank inside temperature sensor 16 and the pressure sensor 8 both provided in the sterilization tank 1 according to the timing selected by the sequencing circuit 24 after subjecting them to A/D conversion, a comparator circuit 24 for comparing the hot water temperature, the tank inside temperature and the tank inside pressure retrieved from the first and second data memories 26 and 27 to provide deviations thereof, and a control signal generating circuit 29 for generating control signals based on the deviations and the control date stored in the first data memory 26, wherein control signals from the control signal generating circuit 29 are subjected to A/D conversion to control the analog steam regulating valve 18, the analog pressure regulating valve 6 and the steam superheater 19 on a real time basis.

The conditions previously set by the input setting circuit 23 can be stored in storage media such as floppy discs, card memories and the like by operation of a personal computer 31 via an external interface circuit 30. Such storage media permits direct inputting of the set conditions when the same type of foods in inert gas-filled packages are processed.

In this arrangement, the sterilization tank 1 having foods in inert gas-filled packages loaded in a hermetically sealed condition is pressurized to a predetermined pressure by a compressor 5. The heated steam flowing through the analog steam regulating valve 18 is further heated by the steam superheater 19 and flows into the heat exchanger 9. The hot water, after having been heated due to heat exchange, is fed into the sterilization tank in jet form. By controlling the analog steam regulating valve 18 and the steam superheater 19 based on the tank inside temperature and the hot water temperature, the tank inside temperature is raised until it reaches approximately 100° C. whereupon that temperature is maintained for a predetermined time (for example, 30 minutes) to perform the primary sterilization and cooking. Thereafter, the steam superheater 19 is again operated so that the hot water supplied to the sterilization tank 1 will increase the inside temperature t to 120° C. and that the particular temperature is maintained for a predetermined time (for example, 5 to 10 minutes). Then, the two-way change-over valve 10a is operated to stop the inflow of circulating hot water and instead to supply cooling water to lower the temperature of the packaged food. In this manner, it is possible to rapidly increase the temperature of the hot water to be applied to the packaged food until it reaches approximately 100° C. whereupon that temperature is maintained to perform cooking and pasteurisation. The temperature of the hot water is further raised to approximately 120° C. and that temperature is maintained for a predetermined time (5 to 10 minutes) to satisfy the F04 sterilization requirements.

Figure 7:
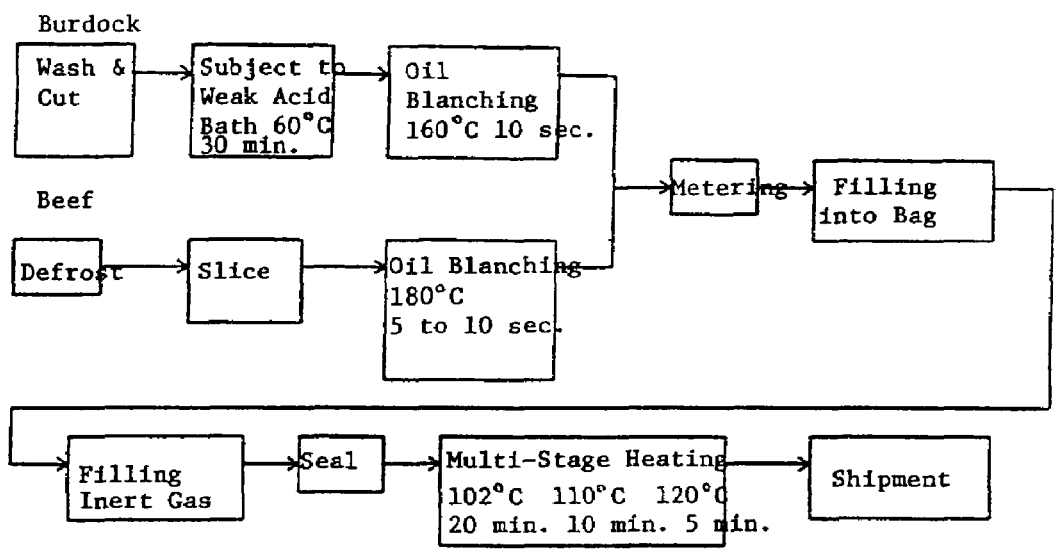
FIG. 7 is a flow chart showing how a packaged food, "beef and burdock sliced thin and cooked lightly with seasonings", is cooked and sterilized.

FIG. 7 is a flow chart showing how the packaged food, "beef and burdock sliced thin and cooked lightly with seasonings", is cooked and sterilized. Burdock is washed and cut into pieces of a predetermined size and, as a preliminary cooking step, it is subjected to a 60° C. weak acid bath for thirty minutes and then is blanched in a 160° C. oil for ten seconds. Beef is sliced to a predetermined thickness and is blanched in a 180° C. oil for five to ten seconds as a preliminary cooking step. The burdock and beef thus cooked preliminarily are mixed and metered and then filled into a bag of gas-impermeable material and sealed under inert gas atmosphere. This packaged food is then subjected to a multi-stage sterilization process in which the temperature is maintained at 102° C. for 20 minutes, at 110° C. for 10 minutes and finally at 120° C. for 5 minutes for shipment as the final product.

By cooking the beef and burdock in this manner, it is possible to sterilize them completely without losing the beef's taste and glutinous mouthfeel and the burdock's crispness.

Further, the preliminary cooking of both beef and burdock before filling into the bag alleviates the sterilization requirements in that complete sterilization is possible in the multi-stage heat steriliztion process at lower than conventionally used temperatures.

Figure 8:
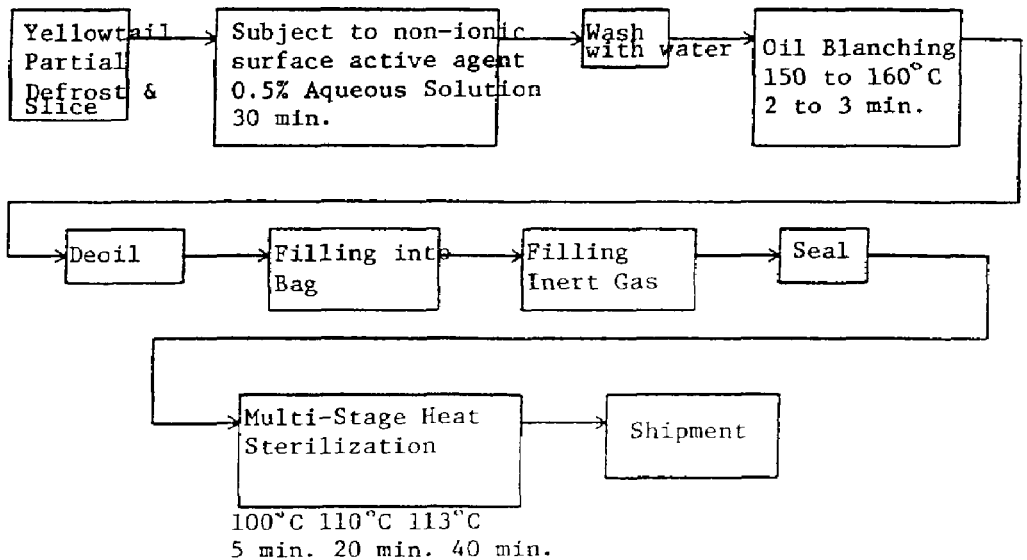
FIG. 8 is a flow chart showing how another packaged food, "yellowtail broiled with soy", is cooked and sterilized.

FIG. 8 is a flow chart for explaining the cooking/sterilization process for "yellowtail broiled with soy". Frozen yellowtail is partially defrozen and sliced and is subjected to an aqueous solution of 0.5% non-ionic surface active agent (such as cane sugar-fatty acid ester) for 30 minutes. After washing with water, it is blanched in a 150 to 160° C. oil for two to three minutes. It is then deoiled and filled into a bag of gas-impermeable material and sealed under inert gas atmosphere. Thereafter, it is subjected to the multi-stage heat sterilization process which maintains the food at 100° C. for five minutes, at 110° C. for twenty minutes and at 113° C. for ten minutes for shipment as the final products.

By cooking the yellowtail in this manner, it is possible to provide it as originally broiled with sauce or gravy while keeping it tender as well as preventing pieces from sticking to each other.

Also, by cooking the yellowtail in the manner as described above, it is possible to perform complete sterilization at lower than conventionally used temperatures in the multi-stage heat sterilization procedure while keeping the fish tender and preventing pieces from sticking to each other.

As described above, the present invention provides completely sterilized foods in inert gas-filled packages with a reduced sterilization temperature as well as a shortened heat sterilization time by preliminarily processing the foods under a predetermined condition followed by using the multi-stage heat sterilization procedure with the inert gas-filled cooking system.

As described above, the present invention provides for complete and quick sterilization of foods in inert gas-filled packages without losing the food's taste and mouthfeel in a manner that satisfies the F04 sterilization requirements for foods by loading preliminarily processed foods in inert gas-filled packages into sterilization tank and following the predetermined sterilization temperature-time curve, i.e., applying a hot water to the food packages in the tank so as to raise the food core temperature rapidly to approximately 100° C., to maintain the temperature for a certain period of time for cooking, and to raise the hot water temperature to 120° C. rapidly.

What is claimed is:

1. An inert gas-filled cooking method for sterilizing food at a food sterilization temperature, comprising the steps of:
   preliminarily processing food by heating which does not cook the food;
   filling the preliminarily processed food which is prepared but not cooked into retort pouches and hermetically sealing the retort pouches under an inert gas atmosphere;
   loading the food retort pouches into a sterilization tank;
   pressurizing the sterilization tank having the food retort pouches loaded therein at a predetermined pressure value by means of a pneumatic conduit and an analog pressure regulating valve;
   raising the temperature of the food in the food retort pouches to a first predetermined temperature value below the sterilization temperature of the food in the food retort pouches by reheating a heated steam supplied to the primary of a heat exchanger by means of a steam superheater causing a rapid increase in the temperature of heated water flowing in the secondary of the heat exchanger and subsequently into the sterilization tank where the heated water is applied to the food retort pouches;
   maintaining the temperature of the food in the food retort pouches at said first predetermined temperature value by continuing the application of the heated water to the food retort pouches;
   raising the temperature of the food in the food retort pouches from said first predetermined temperature value to a second predetermined temperature value which corresponds to the sterilization temperature of the food in the food retort pouches, by increasing the temperature of the heated water supplied to the sterilization tank where the heated water is applied to the food retort pouches;
   maintaining the second predetermined food sterilization temperature on the food in the food retort pouches for a predetermined time by continuing the application of heated water at said second predetermined temperature value which is less than the time at which the first predetermined temperature is maintained; wherein said predetermined pressure value is maintained during the maintenance of said first and second predetermined temperature values; and
   cooling the food retort pouches from said second predetermined food sterilization temperature by applying cooling water instead of hot water on the food retort pouches.

2. The method as defined in claim 1 wherein said preliminary processed food is prepared by blanching in oil.

* * * * *